United States Patent
Yang et al.

(10) Patent No.: US 8,244,732 B2
(45) Date of Patent: Aug. 14, 2012

(54) NAMED ENTITY MARKING APPARATUS, NAMED ENTITY MARKING METHOD, AND COMPUTER READABLE MEDIUM THEREOF

(75) Inventors: Ping-Che Yang, Kaohsiung (TW); Tsun Ku, Taipei (TW); Wei-Shen Lin, Taipei (TW); Chia-Ching Lu, Changhua (TW); Wen-Tai Hsieh, Taipei (TW)

(73) Assignee: Institute for Information Industry, Taipei (TW)

( * ) Notice: Subject to any disclaimer, the term of this patent is extended or adjusted under 35 U.S.C. 154(b) by 286 days.

(21) Appl. No.: 12/788,119

(22) Filed: May 26, 2010

(65) Prior Publication Data
US 2011/0258194 A1 Oct. 20, 2011

(30) Foreign Application Priority Data
Apr. 14, 2010 (TW) ................. 99111577 A (51) Int. Cl.
*G06F 17/30* (2006.01)
(52) U.S. Cl. ..................................... 707/740
(58) Field of Classification Search .......... 707/739, 707/740, 776
See application file for complete search history.

(56) References Cited

U.S. PATENT DOCUMENTS

| | | | |
|---|---|---|---|
| 5,963,940 A * | 10/1999 | Liddy et al. ............... | 1/1 |
| 6,892,204 B2 * | 5/2005 | Haas et al. ............... | 701/532 |
| 7,028,250 B2 * | 4/2006 | Ukrainczyk et al. ...... | 715/202 |
| 7,269,544 B2 * | 9/2007 | Simske .................... | 704/4 |
| 2003/0182310 A1 * | 9/2003 | Charnock et al. ........ | 707/104.1 |
| 2006/0085735 A1 | 4/2006 | Shimizu | |
| 2008/0072134 A1 * | 3/2008 | Balakrishnan et al. .... | 715/230 |
| 2008/0319978 A1 * | 12/2008 | Brun et al. ............... | 707/5 |
| 2010/0004925 A1 * | 1/2010 | Ah-Pine et al. .......... | 704/9 |

FOREIGN PATENT DOCUMENTS
WO WO 2005/029353 3/2005

OTHER PUBLICATIONS

Jul. 20, 2011 office action by the Korean Patent Intellectual Property Office for Patent Application No. 10-2010-0056181 (Korean counterpart to U.S. Appl. No. 12/788,119) , 4 pages.
English translation of the Jul. 20, 2011 office action by the Korean Patent Intellectual Property Office for Patent Application No. 10-2010-0056181, 4 pages.
Reference 1 cited in the Jul. 20, 2011 office action noted above, which is a report in a research project by the Korean Ministry of Justice, entitled "Study on Service of Intelligent System Supporting Legislation," written by Beom-Jong Ryu, 2009, 73 pages.
English translation of pp. 4-5 and 67-71 (i.e. Section 2 and 3-3.1.3) of Reference 1, which were the cited portions of the reference in the Jul. 20, 2011 office action by the Korean Patent Intellectual Property Office for Patent Application No. 10-2010-0056181, 7 pages.

* cited by examiner

*Primary Examiner* — Jorge A Casanova
(74) *Attorney, Agent, or Firm* — Skaar Ulbrich Macari, P.A.

(57) ABSTRACT

A named entity marking apparatus, a named entity marking method, and a computer program product thereof are provided. The named entity marking apparatus comprises a processor and a storage unit, wherein the processor is electrically connected to the storage unit. The storage unit is stored with an electronic document and a named entity database. The processor marks the electronic document into a first marked document by a first set of the named entity database. The processor decides a second set of the named entity database according to the first marked document. The processor re-marks the electronic document into a second marked document by the second set of the named entity database.

13 Claims, 3 Drawing Sheets

NAMED ENTITY MARKING APPARATUS, NAMED ENTITY MARKING METHOD, AND COMPUTER READABLE MEDIUM THEREOF

PRIORITY

This application claims priority to Taiwan Patent Application No. 099111577 filed on Apr. 14, 2010, which is incorporated by reference herein in its entirety.

FIELD

The present invention relates to a named entity marking apparatus, a named entity marking method, and a computer readable medium thereof. More particularly, the present invention marks an electronic document in a plurality of stages, which means that the present invention utilizes a marking result from a previous stage and a different set of a named entity database to mark the electronic document in each different stage.

BACKGROUND

In recent years, with rapid development of the Internet and widespread use of various electronic products (e.g., mobile phones, personal digital assistants (PDAs), notebook computers and electronic books (E-books)), more and more manufacturers and users now provide the general public with various electronic information and electronic reading services. Accordingly, electronic information has become the primary source for people to get information, and reading electronic information has become an indispensable part of people's daily life.

Generally speaking, when a user who is using the electronic reading service (e.g., viewing an E-book or a website) encounters a new or an interesting word, he may desire to know the meaning, basic information or other related derivative information of the word. To cater for this demand, services such as named entity marking and automatic link searching for electronic information have emerged.

Conventionally, most of automatic named entity marking technologies filter specific word strings (e.g., a name of a person, a geographical name, or a proper noun) in an electronic document according to frequencies of the specific word strings and then mark these filtered word strings by labeling their category, description, explanation, or other related information of the named entity. For example, word strings that are often used in an Internet search engines are adopted as a basis for marking a named entity by conventional technologies. Some other technologies employ a tokenization technology or a tokenizer in conjunction with a word library with parts of speech and a syntax tree to tokenize a sentence according to the frequency to generate a tokenization result (e.g., extracting one or more named entities noted with parts of speech) for the named entity marking. However, these conventional named entity marking technologies are usually based on only the frequency of appearance but don't take the category of the named entity into account, so there are deficiencies with these conventional technologies, for example, they fail to determine a named entity to be marked according to contents of a document to be marked and fail to mark a new word with a low frequency of appearance. Therefore, these conventional technologies have drawbacks that they often make wrong markings, mark unrelated words or fail to mark a new word, leading to a poor effect of named entity marking. As an attempt to reduce errors in marking and improve marking accuracy, the conventional named entity marking technologies often resort to manual correction ex post facto, which consumes a lot of human labor and time and makes it impossible to achieve complete automation of named entity marking.

Accordingly, a need exists in the art to provide a named entity marking method that can mark a new word and determine a named entity to be marked according to a document to be marked so that the named entity can be marked in a fully automatic way in the to-be-marked document with an extremely high accuracy without need of manual correction ex post facto.

SUMMARY

An objective of certain embodiments of the present invention is to provide a named entity marking apparatus. The named entity marking apparatus comprises a processor and a storage unit. The processor is electrically connected to the storage unit. The storage unit has an electronic document and a named entity database stored therein. The named entity database comprises a plurality of named entities. Each of the named entities corresponds to at least one category.

The processor is configured to mark the electronic document into a first marked document according to a first set of the named entity database so that the first marked document has a plurality of marked named entities. Each of the marked named entities is one of the named entities comprised in the first set. The processor is further configured to determine at least one first selected category according to the categories corresponding to the marked named entities, and define a second set of the named entity database according to the at least one first selected category. The processor is further configured to re-mark the electronic document into a second marked document according to the second set.

Another objective of certain embodiments of the present invention is to provide a named entity marking method for being applied in the aforesaid named entity marking apparatus. The named entity marking apparatus comprises a processor and a storage unit. The processor is electrically connected to the storage unit. The storage unit has an electronic document and a named entity database stored therein. The named entity database comprises a plurality of named entities. Each of the named entities corresponds to at least one category. The named entity marking method comprises the steps of: (a) enabling the processor to mark the electronic document into a first marked document according to a first set of the named entity database so that the first marked document has a plurality of marked named entities, each of the marked named entities is one of the named entities comprised in the first set; (b) enabling the processor to determine at least one first selected category according to the categories corresponding to the marked named entities, and define a second set of the named entity database according to the at least one first selected category; and (c) enabling the processor to re-mark the electronic document into a second marked document according to the second set.

Yet a further objective of certain embodiments of the present invention is to provide a computer readable medium. The computer readable medium is stored a program for causing an electronic apparatus to execute a named entity marking method when the program is loaded into the electronic apparatus. The electronic apparatus comprises a processor and a storage unit. The processor is electrically connected to the storage unit. The storage unit has an electronic document and a named entity database stored therein. The named entity database comprises a plurality of named entities, and each of the named entities corresponds to at least one category. The program comprises a code A, a code B, and a code C. The code A is for enabling the processor to mark the electronic document into a first marked document according to a first set of the named entity database so that the first marked document has a plurality of marked named entities, and each of the marked named entities is one of the named entities comprised in the first set. The code B is for enabling the processor to determine at least one first selected category according to the categories corresponding to the marked named entities, and define a second set of the named entity database according to the at least one first selected category. The code C is for enabling the processor to re-mark the electronic document into a second marked document according to the second set.

Particular embodiments of the present invention mark the electronic document into a first marked document according to a first set of a named entity database, determine one or more first selected categories according to categories corresponding to the marked named entities comprised in the first marked document, define a second set of the named entity database according to the one or more first selected categories, and then re-mark the electronic document into a second marked documents according to the second set. In this way, the particular embodiments of the present invention can determine a selected category according to preliminarily marked named entities and then re-mark the electronic document according to the determined selected category to avoid marking a named entity that is poorly related to the electronic document. Furthermore, the electronic document is re-marked according to the selected category but not the frequency of appearance, so even a named entity appearing at a low frequency (e.g., a new word or a named entity that appears less frequently) can also be marked. Further, particular embodiments of the present invention can then define a third set of the named entity database according to the second marked document and mark the second marked document into a third marked document according to the third set. Thus, the drawbacks of the conventional technologies that they cannot mark a new word and cannot provide a named entity marking method with high accuracy are addressed by the present invention.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the present invention will be explained with reference to example embodiments thereof. However, these example embodiments are not intended to limit the present invention to any specific environment, applications or particular implementations described in these example embodiments. Therefore, description of these example embodiments is only for purpose of illustration rather than to limit the present invention. It should be appreciated that, in the following example embodiments and the attached drawings, elements unrelated to the present invention are omitted from depiction.

Figure 1:
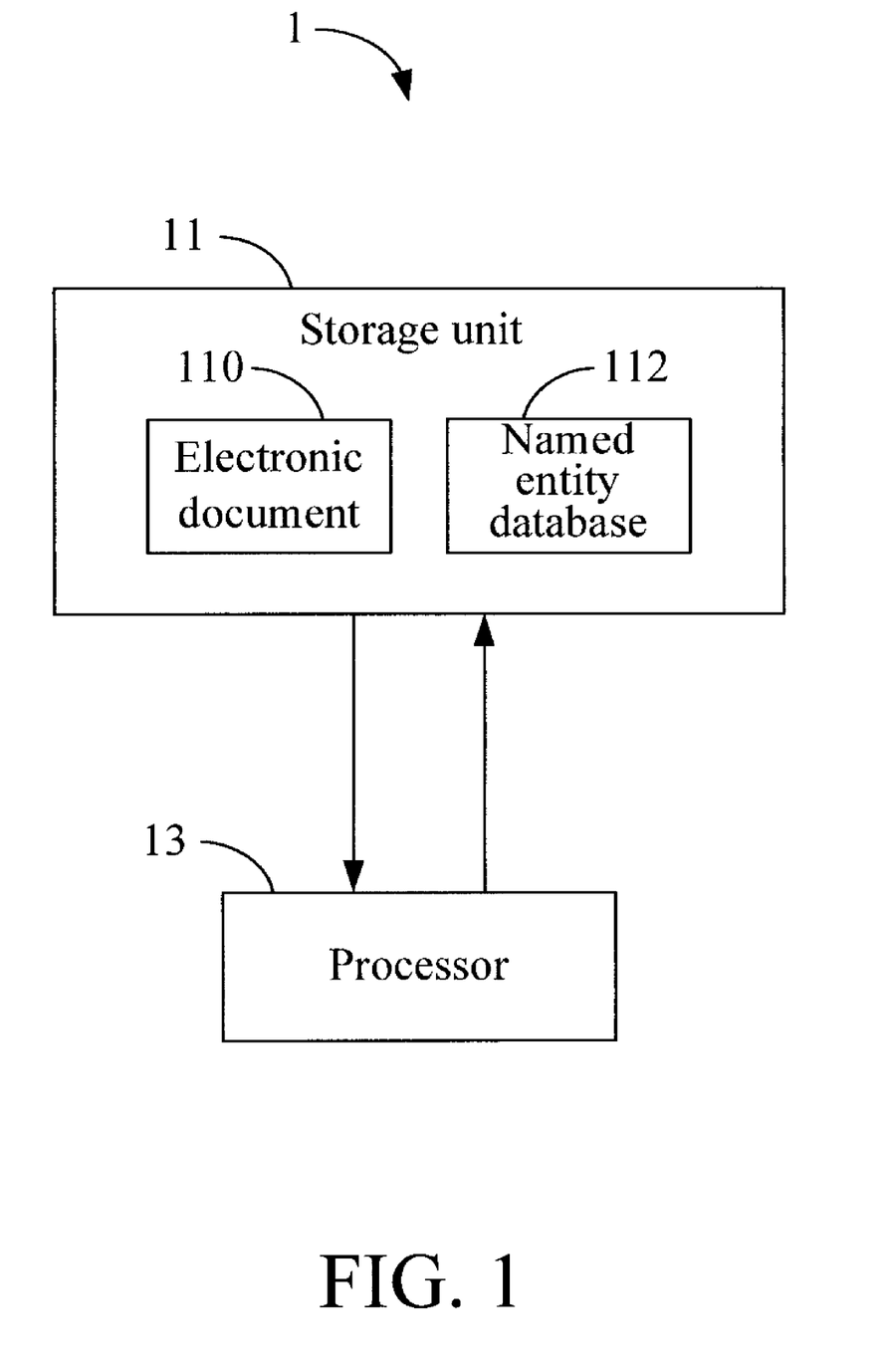
FIG. 1 is a schematic view of a named entity marking apparatus according to a first example embodiment of the present invention.

A first example embodiment of the present invention is a named entity marking apparatus 1, a schematic view of which is depicted in FIG. 1. The named entity marking apparatus 1 comprises a storage unit 11 and a processor 13. The processor 13 is electrically connected to the storage unit 11. The storage unit 11 may have an electronic document 110 and a named entity database 112 stored therein. The storage unit 11 may be a memory, a floppy disk, a hard disk, a compact disk (CD), flash memory disk, a mobile disk, a magnetic tape, a database accessible through networks, or any other storage media with the same function and well known to those of ordinary skill in the art. The processor 13 may be any of various processors, central processing units (CPUs), microprocessors, calculators or other devices with computing capabilities and well-known to those of ordinary skill in the art, either currently available or to be developed in the future.

In the specification of the present application, the term "mark" means (a) to locate an initial address and an ending address of an identifiable named entity in an electronic document by a specific manner and then (b) to append notes recording categories, fields, explanation, introduction, or relevant description of the named entity to the word string between the initial address and the ending address. In short, the "mark" means to append pieces of information to the word string between the initial address and the ending address.

The electronic document 110 set forth in the present invention may be any of various files generated or readable by the electronic apparatus, for example, Hyper Text Markup Language (HTML) files, Portable Document Format (PDF) files, txt files, Microsoft Office Word files, graphic files recognizable by graphic recognition software (e.g., bmp files, jpeg files and gif files) and text files generated by audio recognition software when recognizing an audio file (e.g., a mp3 file, a way file or a wmv file). The electronic document 110 may also be a file formed by texts recognizable or readable by the processor 13.

Hereinbelow, how the named entity marking apparatus 1 marks named entities in the electronic document 110 will be described in detail. For ease of understanding, what "marking the electronic document 110" means will be explained firstly. By "marking the electronic document 110", it means marking some named entities appearing in the electronic document 110 and even further appending notes related to the named entities (e.g., categories of the named entities, fields to which the named entities belong, explanation, introduction or relevant description of the named entities, and website links related to the named entities) so that a user that reads the marked electronic document 110 can obtain relevant information of the named entities from the marks of the named entities, thereby adding to convenience in reading and easiness to acquire knowledge.

A named entity database 112 comprises a plurality of named entities to mark the electronic document. For the named entity database, each of the named entities contained therein corresponds to at least one category (e.g., the named entity may be categorized into one or more categories) and may further correspond to at least one piece of information (e.g., data related to the named entity, for example, a field, definition, explanation, introduction or other related descriptions of the named entity). The present invention may establish a new named entity database or use an existing named entity database. Hereinbelow, a way in which the named entity marking apparatus 1 establishes the named entity database 112 will be exemplified; for example, the processor 13 may, from at least one electronic document having marks, retrieve at least one marked named entity and corresponding categories thereof contained in the at least one electronic document for storage in the named entity database 112. The at least one electronic document having marks may be, for example, a webpage from the Internet, an E-book already having marks or other kinds of files.

In an example embodiment, the processor 13 may collect a plurality of marked electronic documents from the Internet, e.g., a plurality of webpages, a first webpage and a second webpage. The first webpage is a webpage related to the story Harry Potter, and is a webpage in which named entities are marked. Contents recorded in the first webpage comprise a plurality of named entities that are marked, each of which corresponds to at least one category and a piece of information. This will be exemplified in the following Table I.

TABLE I

| Named entity | Category | Information |
|---|---|---|
| Harry Potter | A character in the story Harry Potter, a student in the School of Magic | Leading character of this book, with a lightning-shaped scar on his forehead . . . |
| Hermione | A character in the story Harry Potter | A top student in the School of Magic . . . |
| The Chamber Of Secrets | Title of the story Harry Potter | The 2$^{nd}$ episode of Harry Potter |

The processor 13 may retrieve the marked named entities as well as the corresponding categories and information thereof from the first webpage. For example, the processor 13 may divide the first webpage into a plurality of webpage paragraphs according to webpage tags, wherein the webpage paragraphs include the marked named entities, the information, and the categories. In particular, the processor 13 firstly retrieves the marked named entities, including "Harry Potter", from the first webpage, and then finds a position of "Harry Potter" in the contents of the first webpage, and divides the first webpage into a plurality of webpage paragraphs according to the webpage tags such as "<a href=" . . . "></a>".

Then, by applying an algorithm, the processor 13 retrieves information paragraphs comprising the named entities, the information and the categories from the webpage paragraphs. In this example embodiment, the algorithm may utilize a regular expression to retrieve the webpage information; however, in other embodiments, the algorithm may be any algorithm that can be used to retrieve webpage contents. In other words, any algorithm may be used in this stage in the present invention. Generally speaking, the regular expression is a formal language for low-level programming (which is suitable for extracting text paragraphs exhibiting a specific arrangement but having infinite combinations), which is a general-purpose machine language that can be recognized and processed by the processor. Detailed operations of the regular expression will be readily appreciated by those of ordinary skill in the art and, thus, will not be further described herein.

Next, by applying this algorithm, the processor 13 removes meta data related to the webpage from the information paragraphs, e.g., such webpage tags as font size, color, and layout. Furthermore, the processor 13 utilizes this algorithm to perform a language consistency processing on texts in the information paragraphs, for example, to convert simplified Chinese characters appearing in the information paragraphs into traditional Chinese characters. It should be noted that the language consistency processing also includes converting texts between different languages, for example, to convert English words into Chinese characters by machine translation. Description of these examples is only for purpose of illustration rather than limitation. Furthermore, the processor 13 may also apply the algorithm to determine a structural template in the information paragraph so as to retrieve from the information paragraphs the information and the categories corresponding to the named entities. For example, the processor 13 removes the meta data such as "PMingLiu" and "Sep. 20, 2009" from the information paragraphs by applying the regular expression, and converts the word "妙丽 (Hermione in the simplified Chinese form)" from the simplified Chinese form into the traditional Chinese form "妙麗 (Hermione, in the traditional Chinese form)"; also, the processor 13 determines that there is a piece of information "A top student in the School of Magic . . . " in the structural template "<td> A top student in the School of Magic . . . </td>" and retrieves this piece of information.

As can be known from the above description, the processor 13 can retrieve named entities as well as information and categories corresponding to the named entities from a plurality of marked electronic documents (e.g., a plurality of webpages or other E-book files), and establish or store the named entities as well as the information and categories corresponding to the named entities into the named entity database 112.

After having the named entity database 112 available, the processor 13 may further update the named entity database 112 according to a new or updated electronic document (e.g., a new webpage or a new E-book) either periodically or aperiodically. For example, the storage unit 11 may further store related data of a second webpage, and the processor 13 may retrieve a webpage update time of the second webpage, and determine, according to the webpage update time, whether the second webpage stored in the storage unit 11 has been updated. If the answer is yes, then the processor 13 can retrieve updated contents from the second webpage, and determine whether to update the named entity database 112 according to the updated contents. Hereinbelow, how the processor 13 determines whether to update the named entity database 112 will be detailed.

According to the aforesaid way of establishing the named entity database 112, the processor 13 constructs a named entity list of the updated contents. Here, the named entity list may comprise at least one named entity as well as corresponding categories and information thereof retrieved from the updated contents. Then, by comparing named entities in the named entity list with those of the named entity database 112, the processor 13 determines whether there is any named entity in the named entity list that is identical to one of the named entities of the named entity database 112; if there is, then the processor 13 may further determine whether to update contents of the named entity database 112, for example, whether to update categories or related information corresponding to the named entities of the named entity database 112. On the other hand, by comparing the named entity list with the named entity database 112, the processor 13 also determines whether there is any named entity in the named entity list that is not incorporated in the named entity database 112; if there is, then the processor 13 determines whether to add the different named entity to the named entity database 112. Hereinbelow, both cases will be further detailed.

After determining that there are named entities in the named entity list that are identical to those of the named entity database 112, the processor 13 calculates a percentage of different parts between the new content in the named entity list and the information in the named entity database 112 for each identical named entity according to the new contents of the identical named entity in the named entity list. If it is determined that the percentage is greater than a preset value, then the processor 13 updates the named entity database 112 with the new contents of the named entity list.

Further, the processor 13 may utilize a stoplist to store a number of specific word strings whose appearing frequencies are too high or too low. The processor 13 may exclude the specific word strings in the stoplist from being named entities in the named entity database 112, named entities in the named entity list, marked named entities, or updated contents of named entities. In more detail, the processor 13 may make statistics on word counts and appearance frequencies for all the word strings. Specific word strings that appear at a too high or a too low frequency are usually not "subject words" that are the most related to the contents, so such word strings will be stored in the stoplist. The stoplist may further comprise specific word strings that are related to the system but unrelated to the named entities of the contents. The statistics of word counts and appearance frequencies may be accomplished by, for example, TF-IDF (term frequency—inverse document frequency), or they may also be set and stored in the stoplist according to experiences or historical data.

As an example, the processor 13 determines that "Harry Potter" exists in the named entity list, and information corresponding to "Harry Potter" comprises a content of 100 words. The processor 13 determines that the percentage of different parts between the content of 100 words and the information corresponding to "Harry Potter" in the named entity database 112 is 20%, which is greater than a preset value of 5%, so the processor 13 determines to update the information corresponding to "Harry Potter" by, for example, adding the new contents into the information corresponding to "Harry Potter" in the named entity database 112. As another example, when the stoplist contains word strings such as "edit war" and "dispute update", the processor 13 determines that editor's annotations of the second webpage does not contain such word strings as "edit war" and "dispute update" and because it is determined that the percentage of difference is greater than a preset value, then the processor 13 determines to update the information corresponding to "Harry Potter" in the named entity database 112.

On the other hand, after determining that the named entity list contains a new named entity that is different from any of the named entities of the named entity database 112, the processor 13 adds the new named entity to the named entity database 112. In some other examples, when determining whether to add the new named entity to the named entity database 112, the processor 13 may further retrieve editor's annotations from the second webpage. If it is determined that the editor's annotations contain no specific word string of the stoplist, then the processor 13 adds the new named entity to the named entity database 112. For example, the processor 13 determines that the named entity list contains a new named entity "Draco Malfoy" and corresponding information thereof has a word count of 200; furthermore, the stoplist thereof contains word strings of "advertisement" and "infringement", and it is determined by the processor 13 that editor's annotations of the second webpage don't contain the word strings of "advertisement" and "infringement", so the processor 13 adds the new named entity "Draco Malfoy" and corresponding information of 200 words thereof to the named entity database 112.

Once the named entity database 112 is established, the processor 13 can mark an electronic document 110 according to the named entity database 112. In this embodiment, the electronic document 110 is an E-book of story "Harry Potter". Hereinbelow, how the processor 13 marks the electronic document 110 according to the named entity database 112 will be detailed.

Firstly, the processor 13 determines a first set of the named entity database 112. The first set is a set composed of at least one named entity in the named entity database 112. In some embodiments, the processor 13 may take all named entities comprised in the named entity database 112 as the first set. In other embodiments, the processor 13 may permute the named entities stored in the named entity database 112 according to the number of words of each of the named entities. For example, the permutation may be from the named entity having the most number of words to the named entity to the least number of words. Thereafter, the processor 113 generates the first set according to the permutation result, for example, by selecting the top fifty named entities or the named entities ranked the top 30%. In yet some other embodiments, the processor 13 may also select named entities according to their number of words. For example, the processor 13 may select the named entities whose number of words is larger than 2 or 3.

Next, the processor 13 marks the electronic document 110 into a first marked document according to the first set of the named entity database 112. In a preferred embodiment, the processor 13 may retrieve a part of contents of the electronic document 110 as a to-be-marked electronic document at first; for example, the processor 13 may divide the electronic document 110 into a plurality of document segments equally, and retrieve a specific amount (e.g., 1000) of words from each of the paragraphs as a to-be-marked electronic document. Then, the processor 13 marks the to-be-marked electronic document into a first marked document through word string comparison according to the named entities comprised in the first set so that the first marked document has a plurality of marked named entities, each of which is one of the named entities comprised in the first set. For example, suppose that the first set contains the named entity of "The Chamber Of Secrets", then the word string of "The Chamber Of Secrets" in the to-be-marked electronic document retrieved from the electronic document 110 will be marked by the processor 13. Such marked word strings are referred to as marked named entities in the present invention. It shall be appreciated that, in other examples, the processor 13 may also mark the electronic document 110 into a first marked electronic document according to the named entities comprised in the first set directly without performing the operation of retrieving a to-be-marked electronic document from the electronic document 110.

After generating the first marked electronic document, the processor 13 then determines at least one first selected category according to the categories corresponding to the marked named entities comprised in the first marked electronic document. There is a plurality of ways for the processor 13 to select the first selected category, for example, taking all the categories of all the marked named entities as the first selected categories, or selecting a part of all the categories of the marked named entities as the first selected categories, or selecting all those appearing at a higher frequency as the first selected categories. In a preferred embodiment, the processor 13 may make statistics on the categories corresponding to the marked named entities comprised in the first marked electronic document to obtain a statistical value, which is a sum of times that each of the marked named entities corresponding to each of the categories is marked in the first marked document. Then, the processor 13 selects at least one category as the at least one first selected category according to the statistical value. The processor 13 determines a second set of the named entity database 112 according to the at least one first selected category, and the second set comprises the named entities corresponding to the at least one first selected category. Then, the processor 13 re-marks the electronic document 110 into a second marked document through word string comparison according to the second set. Thereafter, the processor 13 may further store the second marked document into the storage unit 11 or transmit the second marked document to a display unit (not shown) for displaying.

For example, in this embodiment, the first marked document has a plurality of marked named entities including "Harry Potter", "Hermione" and "The Chamber Of Secrets". The processor 13 finds by making statistics that "Harry Potter" appears 576 times in the first marked document and "Hermione" appears 327 times in the first marked document. Since both "Harry Potter" and "Hermione" correspond to the category "A character in the story Harry Potter", the processor 13 determines through these statistics that a statistical value of the category "A character in the story Harry Potter" is 576+327=903. Suppose that the statistical result of this embodiment is: a statistical value of the category "A character in the story Harry Potter" is 903, a statistical value of the category "a student in the School of Magic" is 432, and a statistical value of the category "Title of the story Harry Potter" is 10. Then, the processor 13 selects at least one category with a largest or larger amount as the first selected category according to these statistical values; for example, "A character in the story Harry Potter" is selected as the first selected category. Then, the processor 13 defines a second set in the named entity database 112 according to the first selected category; for example, in the example described above, the second set comprises named entities whose categories correspond to "A character in the story Harry Potter". It shall be noted that, what described above is only an exemplary but not the sole calculation method.

It shall particularly appreciated that, in this example embodiment, the first selected category for defining the second set may be one of the categories defined by the named entity database 112 (i.e., the category with the largest statistical value); however, in other embodiments, the selected category for defining the second set may also be a plurality of ones of the categories, for example, the top two or three categories with larger statistical values. In other words, the present invention may have an unlimited amount of the first selected category (categories); for example, the category "A character in the story Harry Potter" and the category "a student in the School of Magic" may be selected simultaneously as the first selected categories, and the second set is defined according to the named entities corresponding to these two categories.

The aforesaid second marked document marked according to the second set has a plurality of marked named entities, and each of the marked named entities of the second marked document is one of the named entities comprised in the second set. Generally speaking, the marked named entities in the second marked document are marked according to one or more first selected categories, and may be partially identical to and partially different from the marked named entities in the first marked document.

Further speaking, a mechanism may further be provided. When being employed to further process the second marked document, the mechanism allows more named entities to be marked in the electronic document 110. Specifically, the processor 13 can further determine a third set of the named entity database 112 according to the information corresponding to the marked named entities of the second marked document, and mark the second marked document into a third marked document through word string comparison according to the third set. In some embodiments, named entities comprised in the third set are those retrieved from the named entity database 112 and not comprised in the second set according to the information corresponding to the marked named entities of the second marked document. The processor 13 can then mark the named entities of the second marked document that are not comprised in the second set according to the third set.

Further speaking, the processor 13 can determine the third set of the named entity database 112 in one of the following two ways:

Firstly, a first way of determining the third set will be described. The processor 13 determines that the information corresponding to the marked named entities of the second marked document comprises at least one named entity that is not marked in the second marked document, and the at least one unmarked named entity is not incorporated in the second set and corresponds to a second selected category different from the first selected category. The processor 13 can then determine that the third set comprises the named entities corresponding to the second selected category and not comprised in the second set.

For example, the processor 13 determines that the information "Leading character of this book, with a lightning-shaped scar on his forehead . . . " corresponding to a marked named entity "Harry Potter" of the second marked document comprises an unmarked named entity "School of Witchcraft and Wizardry" which does not belong to the aforesaid second set. Because "School of Witchcraft and Wizardry" corresponds to the category "School of Magic" (one of the categories defined by the named entity database 112), the processor 13 can then determine that the third set comprises the named entities corresponding to the category "School of Magic".

Next, a second way of determining the third set will be described. The processor 13 determines that the information corresponding to the marked named entities of the second marked document comprises at least one unmarked named entity which is not incorporated in the second set. The processor 13 can then determine that the third set comprises the at least one unmarked named entity.

For example, the processor 13 determines that the information "Leading character of this book, with a lightning-shaped scar on his forehead . . . " corresponding to a marked named entity "Harry Potter" of the second marked document has an unmarked named entity "School of Witchcraft and Wizardry" which does not belong to the second set. Hence, the processor 13 can then determine that the third set comprises "School of Witchcraft and Wizardry".

After the processor 13 adds new marks to the second marked document to obtain the third marked document according to the third set, the third marked document has a plurality of marked named entities (e.g., in the aforesaid embodiment, it comprises the named entities marked according to the second set and the third set). At this point, the named entity marking of the electronic document 110 may be considered to be completed, and the third marked document can be stored in the storage unit 11 or transmitted to a display unit (not shown) for displaying.

Furthermore, in the present invention, correlations may be established between the marked named entities in the second marked document or the third marked document.

Firstly, by applying a grouping algorithm, the processor 13 groups the marked named entities into a plurality of groups according to the categories corresponding to the marked named entities. Then, a core marked named entity is selected, and by applying the grouping algorithm, the processor 13 calculates a characteristic value between the core marked named entity and each of the named entities respectively in each of the groups, and calculates a group characteristic value between the core marked named entity and each of the groups. Thereafter, the processor 13 can select a plurality of groups with the largest group characteristic values and a plurality of named entities with the largest characteristic values in its groups to establish correlations. The correlations, as shown in FIG. 2, can be displayed through a display apparatus or an operating interface.

Figure 2:
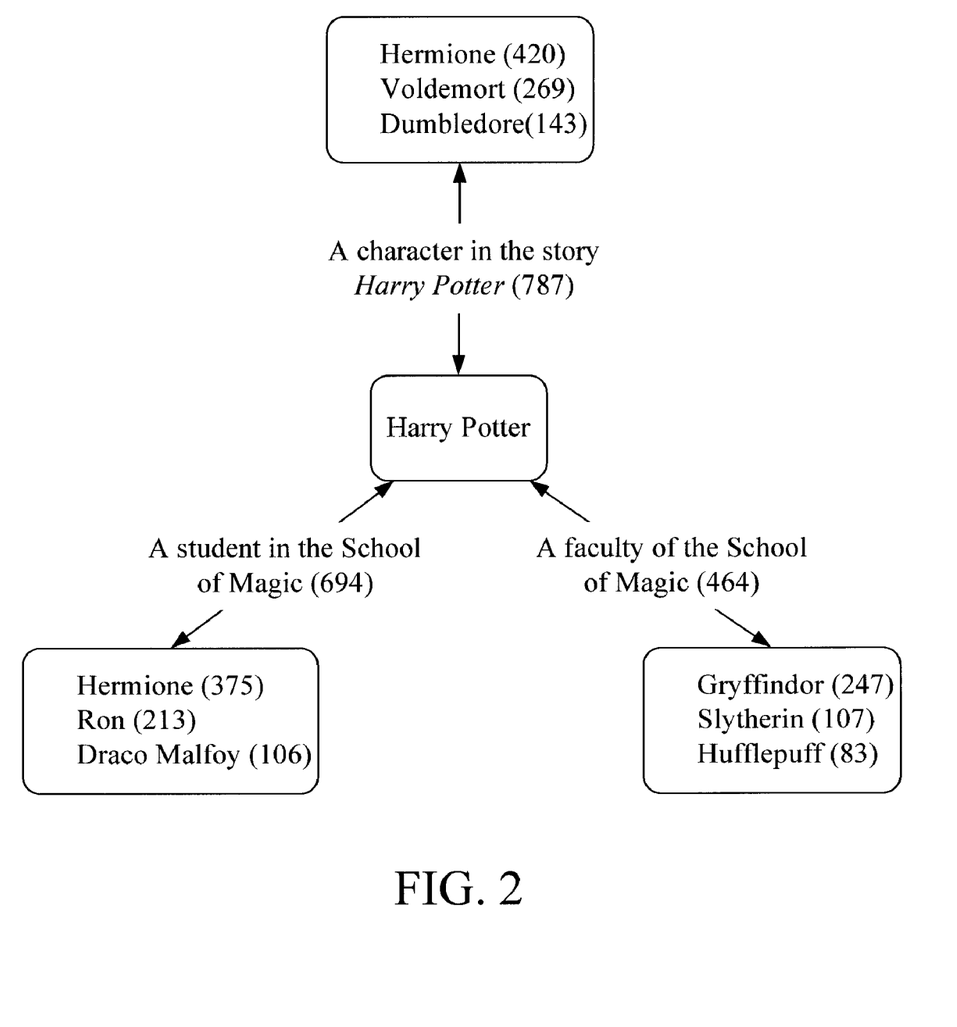
FIG. 2 is a schematic view illustrating correlations in the first example embodiment of the present invention.

In FIG. 2, suppose that a marked electronic document has 46 marked named entities and the 46 marked named entities correspond to 7 categories, then the processor 13 can group the marked named entities into 7 groups by applying a grouping algorithm. In this example embodiment, "Harry Potter" is selected as the core marked named entity (in other embodiments, one of other marked named entities may also be selected as the core marked named entity). The processor 13 can calculate a characteristic value between each of the named entities in each of the groups and the core marked named entity; for example, as shown in FIG. 2, "420" from "Hermione (420)" in the group "A character in the story Harry Potter" is just the characteristic value of "Hermione" corresponding to "Harry Potter" in the group "A character in the story Harry Potter", and "375" from "Hermione (375)" in the group "A student in the School of Magic" is just the characteristic value of "Hermione" corresponding to "Harry Potter" in the group "A student in the School of Magic". Additionally, the processor 13 calculates a group characteristic value of each of the groups; for example, as shown in FIG. 2, "787" from "A character in the story Harry Potter (787)" is just the group characteristic value corresponding to "A character in the story Harry Potter". Finally, the processor 13 selects a plurality of (e.g., 3) groups with the largest group characteristic values and a plurality of (e.g., 3) marked named entities with the largest characteristic values in the plurality of groups to depict correlations between "Harry Potter" and the group "A character in the story Harry Potter", the group "A student in the School of Magic" and the group "Faculties of the School of Magic", and between "Harry Potter" and such marked named entities as "Hermione", "Voldemort", "Dumbledore", "Ron" . . . , as shown in FIG. 2.

The characteristic value between each of the named entities in each of the groups and the core marked named entity can be calculated according to a ontological space or a semantic tree structure of named entities established beforehand or a characteristic value formula, for example, according to a distance between each of the named entities and the core marked named entity in the semantic tree structure of named entities. The group characteristic value between each of the groups and the core marked named entity can be calculated according to the characteristic values of a part or all of the named entities in the group. In an example embodiment, by applying a greedy algorithm, distances between each of the named entities in a group and the core marked named entity can be listed out, and all the named entities are sequenced and divided into a plurality of sections (e.g., three equal sections or five equal sections), each of which is assigned a coefficient. Thereafter, the group characteristic value is calculated by use of a specific formula; for example, the characteristic value of each of the named entities in the group (or each of a plurality of top named entities in the group) is multiplied with the coefficient of the section to which the named entity belongs respectively and then the products corresponding to the named entities are added together to obtain the group characteristic value of the group. Also, there is a plurality of ways of calculating the group characteristic value, for example, adding the characteristic values of all or a part of named entities in a group together directly, or calculating by use of other formulas.

Figure 3:
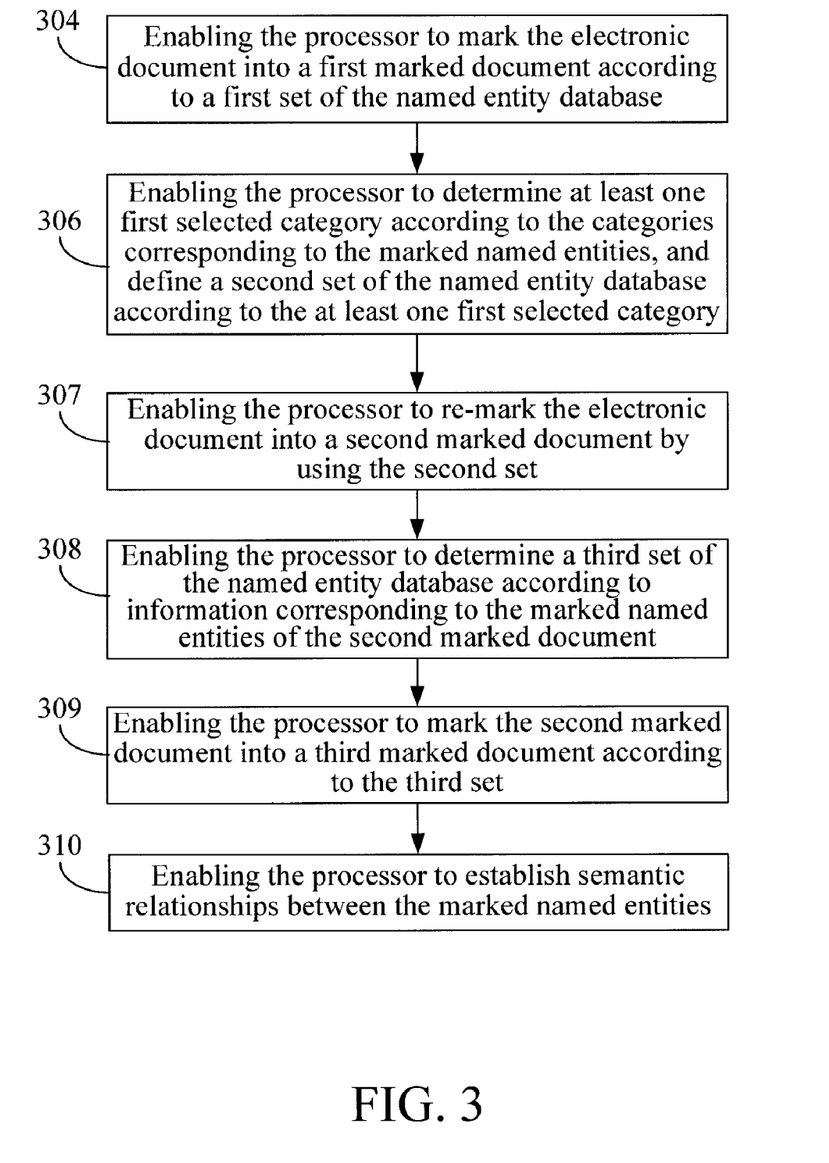
FIG. 3 is a flowchart of a second example embodiment of the present invention.

A second example embodiment of the present invention is shown in FIG. 3, which is a named entity marking method for the named entity marking apparatus as described in the first embodiment. The named entity marking apparatus comprises a processor and a storage unit. The processor is electrically connected to the storage unit. The storage unit has an electronic document and a named entity database stored therein. The named entity database comprises a plurality of named entities, each of which corresponds to at least one category and a piece of information.

Furthermore, the named entity marking method described in the second example embodiment may also be implemented as a program. The program may be stored on a computer readable medium. When the program product is loaded into an electronic apparatus (such as the named entity marking apparatus), the program causes the electronic apparatus to execute the named entity marking method. The electronic apparatus may be a computer, a calculator, a server, a PDA, a notebook computer, or a net book. The program comprises a plurality of codes to execute the named entity marking method described in the second embodiment. This computer readable medium may be a machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

FIG. 3 is a flowchart of the named entity marking method of the second example embodiment. Step 304 is executed to enable the processor to mark the electronic document into a first marked document according to a first set of the named entity database. The first marked document has a plurality of marked named entities, each of which is one of the named entities comprised in the first set.

After execution of the step 304, step 306 is then executed to enable the processor to determine at least one first selected category according to the categories corresponding to the marked named entities, and define a second set of the named entity database according to the at least one first selected category. Then, step 307 is executed to enable the processor to re-mark the electronic document into a second marked document according to the second set.

Further speaking, the named entity marking method may further execute step 308 to enable the processor to determine a third set of the named entity database according to information corresponding to the marked named entities of the second marked document. Then, step 309 is executed to enable the processor to mark the second marked document into a third marked document according to the third set. Finally, step 310 is executed to enable the processor to establish correlations between the marked named entities.

In other example embodiments, the named entity marking method may further comprise steps 301~303 (not shown in FIG. 3). The step 301 is executed to enable the processor to retrieve a plurality of named entities from at least one electronic document to construct the named entity database, wherein the processor may retrieve the named entities from at least one webpage by applying a regular expression. The step 302 is executed to enable the processor to determine whether the electronic document has been updated. If the answer is yes, then the step 303 is executed to enable the processor to update the named entity database, and thereafter, the step 304 is executed; otherwise, if the answer is no, then the step 304 is executed directly by the processor.

In some other example embodiments, following the step 304, step 305 may be added to enable the processor to make statistics on the categories corresponding to the marked named entities of the first marked document to obtain a plurality of statistical values. Each of the statistical values is a sum of times that each of the marked named entities corresponding to each of the categories is marked in the first marked document.

In addition to the aforesaid steps, the second example embodiment can also execute all the operations and functions set forth in the first example embodiment. How the second example embodiment executes these operations and functions will be readily appreciated by those of ordinary skill in the art based on the explanation of the first example embodiment, and thus will not be further described herein.

According to the above descriptions, certain embodiments of the present invention mark an electronic document into a first marked document according to a first set of a named entity database and determine at least one first selected category according to the categories corresponding to the marked named entities, so as to learn with which categories the electronic document is more related. Then, a second set of the named entity database is determined according to the more related categories, and re-marks the electronic document into a second marked document according to the second set. In this way, marking the named entities less related with the electronic document can be avoided. Thereby, the drawbacks of the conventional technologies that they cannot mark a new word and cannot provide a named entity marking method with high accuracy can be overcome by the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A named entity marking apparatus, comprising:
   a storage unit, being configured to store an electronic document and a named entity database, the named entity database comprising a plurality of named entities, each of the named entities corresponding to a piece of information, each of the named entities corresponding to at least one category; and
   a processor, being electrically connected to the storage unit and configured to:
   mark the electronic document into a first marked document according to a first set of the named entity database so that the first marked document has a plurality of marked named entities, each of the marked named entities being one of the named entities comprised in the first set;
   determine at least one first selected category according to the categories corresponding to the marked named entities;
   define a second set of the named entity database according to the at least one first selected category;
   re-mark the electronic document into a second marked document according to the second set, the second marked document having a plurality of marked named entities, each of the marked named entities of the second marked document being one of the named entities comprised in the second set; and
   determine a third set of the named entity database according to the pieces of information corresponding to the marked named entities of the second marked document and mark the second marked document into a third marked document according to the third set,
   wherein the processor determines that the pieces of information corresponding to the marked named entities of the second marked document comprise at least one unmarked named entity in the second marked document, and when the at least one unmarked named entity is not incorporated in the second set but corresponds to a second selected category, the processor determines that the third set comprises the named entities corresponding to the second selected category.

2. The named entity marking apparatus as claimed in claim 1, wherein the processor determines the at least one first selected category according to a plurality of statistical values, and each of the statistical values is a sum of times that each of the marked named entities corresponding to each of the categories is marked in the first marked document.

3. The named entity marking apparatus as claimed in claim 1, wherein the second set comprises the named entities corresponding to the at least one first selected category in the named entity database.

4. The named entity marking apparatus as claimed in claim 1, wherein the processor determines that the third set comprises the at least one unmarked named entity.

5. The named entity marking apparatus as claimed in claim 1, wherein the processor further retrieves, from at least one electronic document having marks, at least one marked named entity contained therein to construct the named entity database.

6. The named entity marking apparatus as claimed in claim 1, wherein the second marked document has a plurality of marked named entities, and the processor is further configured to establish correlations between the marked named entities.

7. A named entity marking method for being applied in a named entity marking apparatus, the named entity apparatus comprising a processor and a storage unit, the processor being electrically connected to the storage unit, the storage unit having an electronic document and a named entity database stored therein, the named entity database comprising a plurality of named entities, each of the named entities corresponding to a piece of information, each of the named entities corresponding to at least one category, and the named entity marking method comprising the following steps of:
   (a) enabling the processor to mark the electronic document into a first marked document according to a first set of the named entity database so that the first marked document has a plurality of marked named entities, each of the marked named entities being one of the named entities comprised in the first set;

(b) enabling the processor to determine at least one first selected category according to the categories corresponding to the marked named entities, and define a second set of the named entity database according to the at least one first selected category;

(c) enabling the processor to re-mark the electronic document into a second marked document according to the second set, wherein the second marked document has a plurality of marked named entities, each of the marked named entities of the second marked document is one of the named entities comprised in the second set;

(d) enabling the processor to determine a third set of the named entity database according to the pieces of information corresponding to the marked named entities of the second marked document, wherein the pieces of information corresponding to the marked named entities of the second marked document has at least one unmarked named entity in the second marked document, when the at least one unmarked named entity is not incorporated in the second set but corresponds to a second selected category, the processor determines that the third set comprises the named entities corresponding to the second selected category; and (e) enabling the processor to mark the second marked document into a third marked document according to the third set.

8. The named entity marking method as claimed in claim 7, wherein in the step (b), the processor determines the at least one first selected category according to a plurality of statistical values, and each of the statistical values is a sum of times that of each of the marked named entities corresponding to each of the categories is marked in the first marked document.

9. The named entity marking method as claimed in claim 7, wherein the second set comprises the named entities corresponding to the at least one first selected category in the named entity database.

10. The named entity marking method as claimed in claim 7, wherein the step (d) further comprises the following step of:

(d1) enabling the processor to determine that the third set comprises the at least one unmarked named entity.

11. The named entity marking method as claimed in claim 7, further comprising the following step prior to the step (a):
enabling the processor to retrieve, from at least one electronic document having marks, at least one marked named entity contained therein to construct the named entity database.

12. The named entity marking method as claimed in claim 7, wherein the named entity marking method further comprises the following step of:

(f) enabling the processor to establish correlations between the marked named entities.

13. A non-transitory computer readable medium, storing a program for causing an electronic apparatus to execute a named entity marking method when the program is loaded into the electronic apparatus, the electronic apparatus comprising a processor and a storage unit, the processor being electrically connected to the storage unit, the storage unit having an electronic document and a named entity database stored therein, the named entity database comprising a plurality of named entities, each of the named entities corresponding to at least one category, the program comprising:

a code A for enabling the processor to mark the electronic document into a first marked document according to a first set of the named entity database so that the first marked document has a plurality of marked named entities, each of the marked named entities being one of the named entities comprised in the first set;

a code B for enabling the processor to determine at least one first selected category according to the categories corresponding to the marked named entities, and define a second set of the named entity database according to the at least one first selected category;

a code C for enabling the processor to re-mark the electronic document into a second marked document according to the second set, wherein the second marked document has a plurality of marked named entities, each of the marked named entities of the second marked document is one of the named entities comprised in the second set;

a code D for enabling the processor to determine a third set of the named entity database according to the pieces of information corresponding to the marked named entities of the second marked document, wherein the pieces of information corresponding to the marked named entities of the second marked document has at least one unmarked named entity in the second marked document, when the at least one unmarked named entity is not incorporated in the second set but corresponds to a second selected category, the processor determines that the third set comprises the named entities corresponding to the second selected category; and a code E for enabling the processor to mark the second marked document into a third marked document according to the third set.

* * * * *